(12) United States Patent
Yen et al.

(10) Patent No.: US 7,308,190 B2
(45) Date of Patent: Dec. 11, 2007

(54) DEVICE FOR DECODING DISC READ SIGNAL AND METHOD THEREOF

(75) Inventors: Kuang-Yu Yen, Tai-Chung (TW); Shieh-Hsing Kuo, Taipei (TW)

(73) Assignee: Realtek Semiconductor Corp., HsinChu (TW)

( * ) Notice: Subject to any disclaimer, the term of this patent is extended or adjusted under 35 U.S.C. 154(b) by 751 days.

(21) Appl. No.: 10/710,371

(22) Filed: Jul. 6, 2004

(65) Prior Publication Data
US 2006/0008255 A1    Jan. 12, 2006

(51) Int. Cl.
*H04N 5/91* (2006.01)
(52) U.S. Cl. ........................................... 386/95
(58) Field of Classification Search ............... 386/46, 386/47, 95, 113

See application file for complete search history.

(56) References Cited

U.S. PATENT DOCUMENTS 6,122,764 A * 9/2000 Kobayashi .................. 714/758
6,360,057 B1 * 3/2002 Tsumagari et al. ............ 386/95
6,385,389 B1 * 5/2002 Maruyama et al. ........... 386/95

* cited by examiner

*Primary Examiner*—Thai Q. Tran
*Assistant Examiner*—Mishawn Dunn
(74) *Attorney, Agent, or Firm*—Winston Hsu

(57) ABSTRACT

A device for decoding a disc read signal generated by accessing data stored in a disc storage medium. The device includes: a multi-level analog-to-digital converter (ADC) for digitizing the disc read signal to generate a digitized disc read signal; a confidence index generating circuit for generating a plurality of confidence indexes according to the magnitude of the digitalized disc read signal; a demodulator coupled to the multi-level ADC for demodulating the digitalized disc read signal to generate a demodulated disc read signal; and an Error Correction Code (ECC) decoder coupled to the demodulator for decoding the demodulated disc read signal according to the confidence indexes.

34 Claims, 5 Drawing Sheets

DEVICE FOR DECODING DISC READ SIGNAL AND METHOD THEREOF

BACKGROUND OF INVENTION

1. Field of the Invention

The present invention relates to a disc recording system, and more particularly, to a device and a method for decoding a disc read signal.

2. Description of the Prior Art

Within an optical disc such as a DVD, it is common that encoded data is arranged to perform error correction in 32 KB units of data. This error correction unit is referred to as an ECC block. FIG. 1 is an explanatory view showing a format of an ECC block contained in an optical disc. A format of the ECC block is arranged to be a two-dimensionally arranged data consisting of 172 words×192 rows and contains parity bits to be added in two error-correcting systems. These two kinds of error-correcting systems add parity bits that are referred to as a PI parity or a PO parity into the ECC block. These PI and PO parities are used when the encoded data is error-corrected by a Reed Solomon Product Code (RSPC). The technique mentioned above is well known in the art.

During an ECC decoding process, a parameter ρ, which is referred to as an erasure, is considered to represent a number of known error locations within an ECC block. The parameter of erasure is very helpful to the subsequent error-correction decoding operation. However, if the parameter ρ is of a large value which comes from false alarm due to an improper implementation of an ECC decoding circuit and/or some other causes, it would hinder the decoding capacity of the ECC decoding circuit. Additionally, if the parameter ρ is too large, it would be difficult for the subsequent error-correction decoding circuit to derive the ECC decoding process.

SUMMARY OF INVENTION

It is therefore an objective of the present invention to provide a device and a method for decoding a disc read signal to solve the above-mentioned problem.

According to one embodiment, the present invention provides a device for decoding a disc read signal generated by accessing data stored in a disc storage medium. The device includes: a multi-level analog-to-digital converter (ADC) for digitizing the disc read signal to generate a digitized disc read signal; a confidence index generating circuit for generating a plurality of confidence indexes according to the magnitude of the digitalized disc read signal; a demodulator coupled to the multi-level ADC for demodulating the digitalized disc read signal to generate a demodulated disc read signal; and an Error Correction Code (ECC) decoder coupled to the demodulator for decoding the demodulated disc read signal according to the confidence indexes.

While providing the above-mentioned device, the present invention further provides a method for decoding a disc read signal generated by accessing data stored in a disc storage medium. The method includes: digitizing the disc read signal to generate a multi-level digitized disc read signal; generating a plurality of confidence indexes according to the magnitude of the digitalized disc read signal; demodulating the digitalized disc read signal to generate a demodulated disc read signal; and decoding the demodulated disc read signal according to the confidence indexes.

It is an advantage of the present invention that the present invention method and device perform the ECC decoding according to the confidence indexes so that the appearance rate of false alarms will be reduced. As a result, the decoding efficiency is increased.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
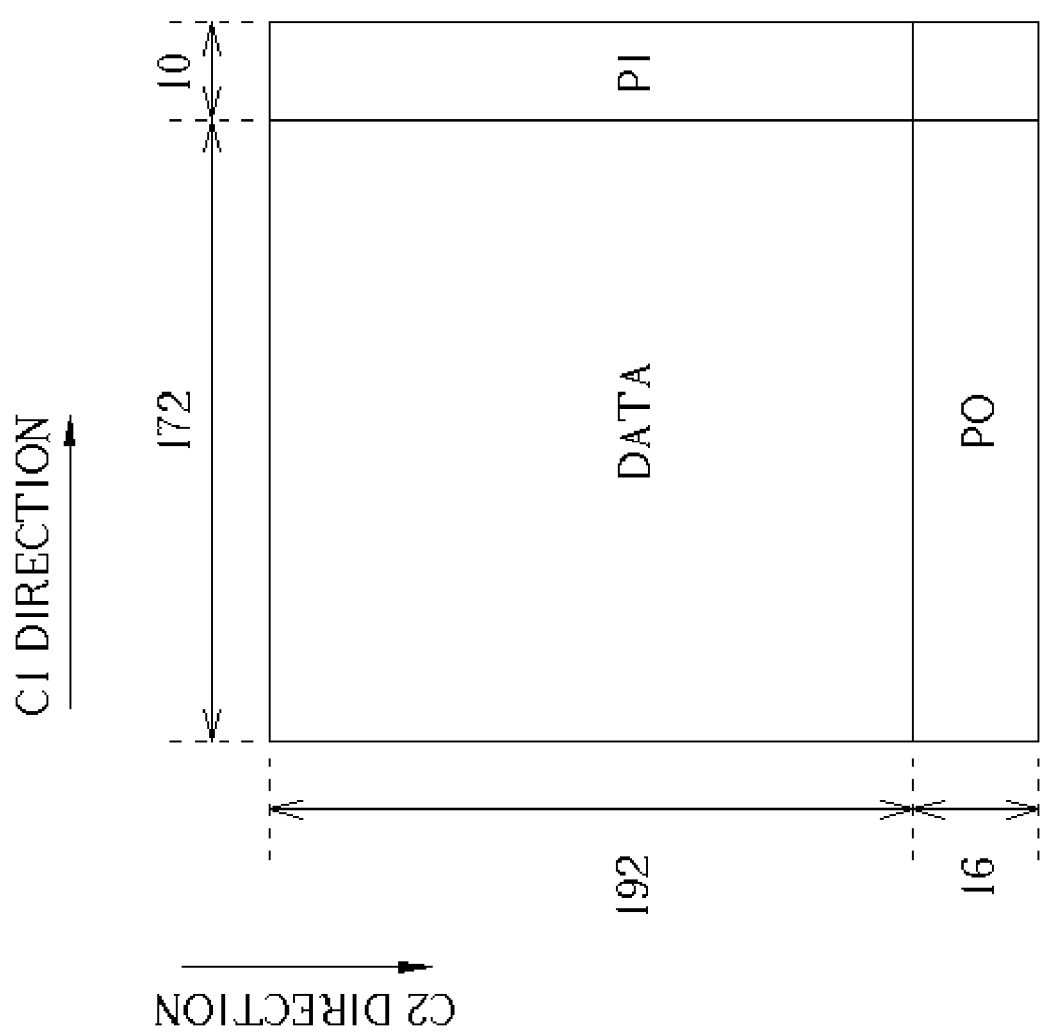
FIG. 1 is an explanatory view showing a format of an ECC block contained in an optical disc.
Figure 2:
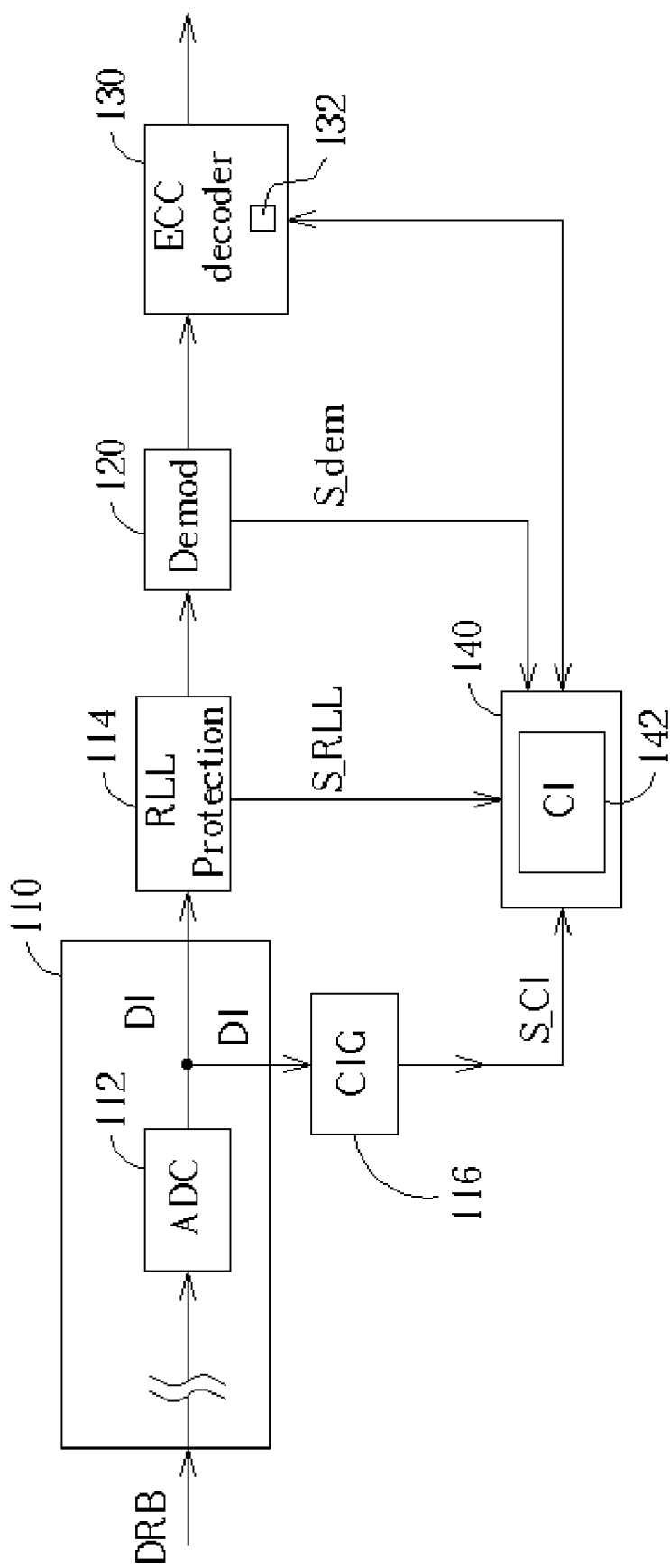
FIG. 2 is a block diagram of a device for decoding disc read signal according to one embodiment of the present invention.

Please refer to FIG. 2 illustrating a block diagram of a device for decoding disc read signal 100 according to one embodiment of the present invention. The disc read signal decoding device 100 is set in an optical storage control device for accessing an optical storage medium. In this embodiment, the optical storage medium is a Digital Versatile Disc (DVD), and the optical storage device is a DVD drive, and therefore, the disc read signal DRB is a DVD read signal.

Figure 3:
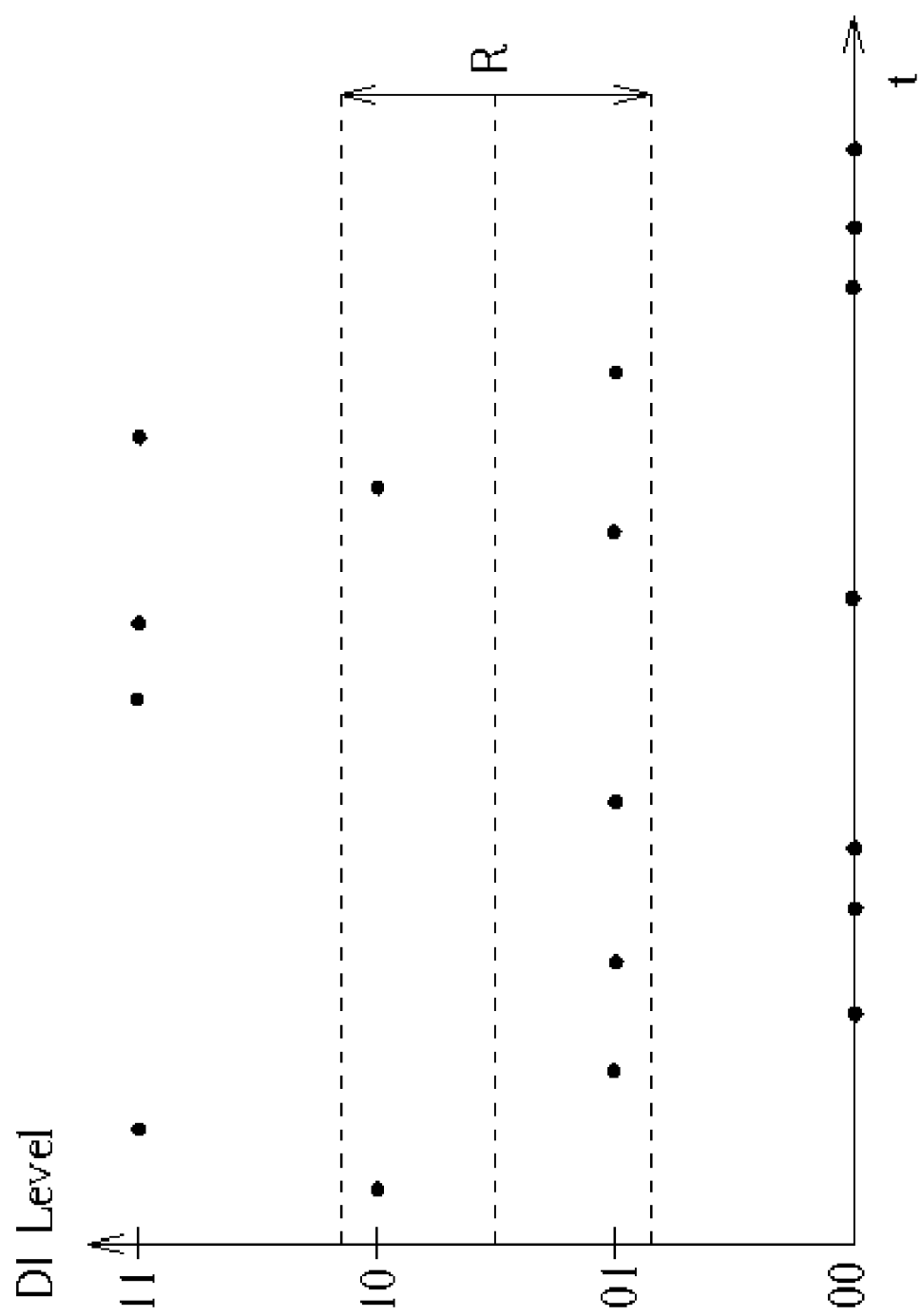
FIG. 3 is a timing diagram shows levels of the read signals outputted from ADC.

The device 100 includes a read channel 110 comprising a 2-bit Analog-to-Digital Converter (ADC) 112 for digitalizing the DVD read signal DRB to output the digital signal DI. FIG. 3 is a timing diagram shows levels of the digital signal DI outputted from multi-level ADC 112. In this embodiment, the multi-level ADC 112 is a 2-bit ADC, which outputs the digital signal DI in four level, i.e. 00, 01, 10, and 11, as shown in FIG. 3. However, it is no the necessary limitation of the present invention. Due to errors caused by various factors in the operation of accessing the data stored in the optic storage medium, the read signal DRB may not be digital and the magnitude of the read signal DRB may be distributed in a range. In this manner, the magnitude of the digital signal DI generated through digitalizing the read signal DRB may be one of the four values shown in FIG. 2 since the ADC 112 is a 2-bit ADC. The statistical distribution of the magnitude of the digital signal DI may reflect the performance of the operation of data accessing. If more errors are caused in the progress of the data accessing operation, there will be more digital signals DI with magnitude either 01 or 10, which means that the performance of data accessing operation is poor.

In this embodiment, the device 100 comprises a confidence index generator (CIG) 116 coupled to the multi-level ADC 112 for generating a plurality of confidence indexes through detecting the statistical distribution of the magnitude of the digital signal DI. A range R enclosing levels is considered to be uncertain levels of the digital signal DI is defined within the full range of all the levels of the digital signal D1. That is, if the magnitude of the digital signal DI falls within the range R, it is difficult to determine whether the value of the digital signal DI is. If the number of digital signals DI whose magnitude fall within the range R is greater than a threshold T1, it means that the quality of the read signal DRB is poor and the possibility of erroneous decoding read signal DRB is high. Under this circumstance, the confidence index generated by confidence index generator 116 would represent the poor quality of read signal DRB. If the number of digital signals DI whose magnitude fall with the range R is less than a threshold T2, it means that the quality of the read signal DRB is good and the possibility of erroneous decoding read signal DRB is low. Under this circumstance, the confidence index generated by confidence index generator 116 would represent the good quality of read signal DRB.

The confidence indexes S_CI outputted from CIG 116 are stored in the CI table 142 of the memory 140. The CI table 142 stores the information that the position of the error data in the ECC block. In addition, the information stored in the CI table 142 may indicate the quality of the read signal DRB. In other word, the information stored in the CI table 142 may indicate the performance of the data accessing operation when accessing the corresponding data of this ECC block. It should be noted that each of the confidence indexes generated by confidence index generator 116 is correspondent to a word, a row or an entire ECC block.

Figure 4:
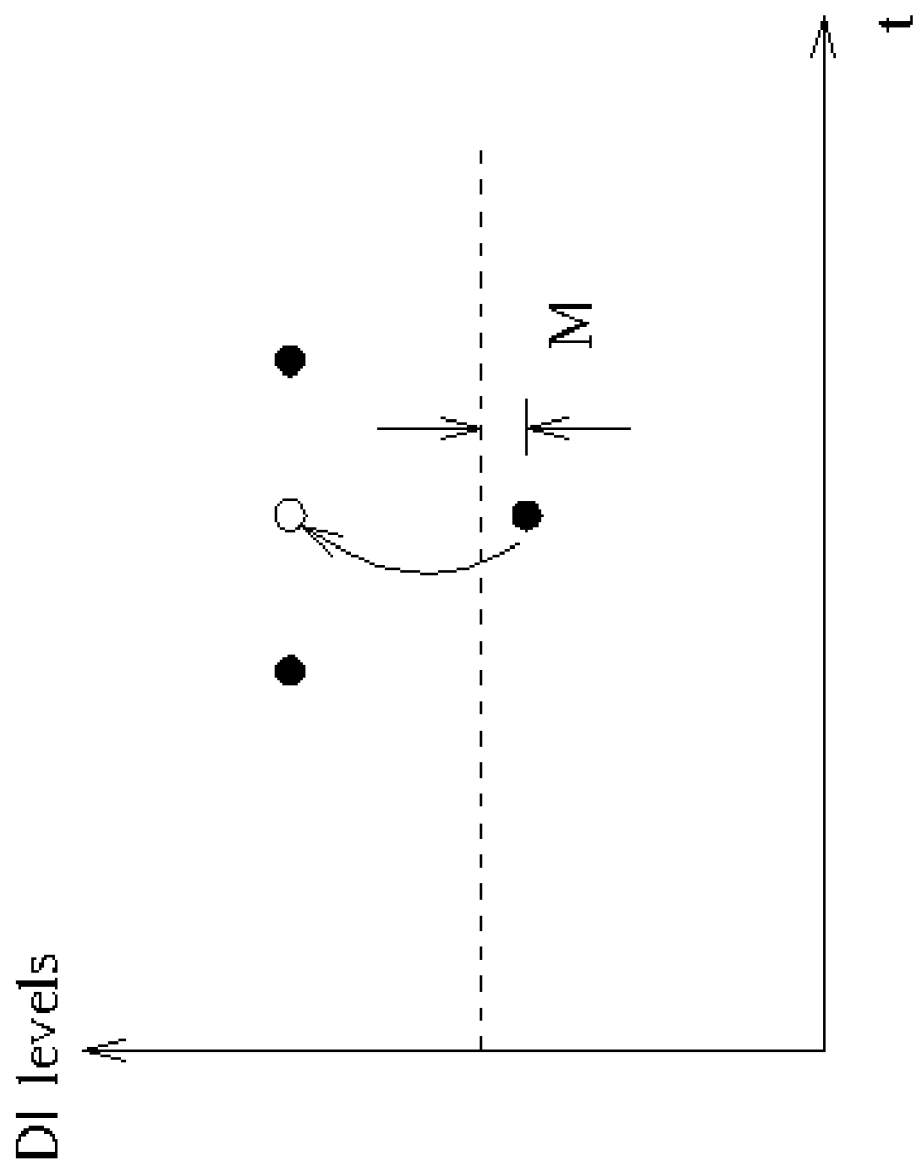
FIG. 4 is a diagram showing a correction during an RLL correction process performed by RLL protection circuit 114 of FIG. 2.

Furthermore, the digital signal DI generates from ADC 112 is inputted into the RLL protection unit 114 as well. Please refer to FIG. 4, which shows a correction during a Run Length Limited (RLL) correction process performed by RLL protection circuit 114 of FIG. 2. The digital signal DI, which is not follow the standard of RLL code, can be corrected in the Run Length Limited (RLL) correction process. The RLL correction process is well known in the art and will not be explained in great detail herein. The number of bits must be corrected and the difference M between the magnitude of an error bit of data and a DC level of the digital signal DI may be the confident indexes to reflect the performance of the operation of data accessing. If more errors are caused in the progress of the data accessing operation, there will be more bits of the digital signals DI to be corrected in the Run Length Limited (RLL) correction process and the difference M between the magnitude of an error bit of data and a DC level of the digital signal DI may be large. In this embodiment, RLL protection circuit 114 may output a RLL detection result signal S_RLL for notification. The RLL detection result signal S_RLL outputted from RLL protection circuit 114 may update the data stored in the CI table 142 to mark the position of the error data in a ECC block. In addition, the RLL detection result signal S_RLL outputted from RLL protection circuit 114 may update the data stored in the CI table 142 to indicate the performance of the data accessing operation when accessing corresponding data of this ECC block. In this embodiment, the RLL detection result signal S_RLL being generated may be proportional to 1/M or the number of the corrected error bits.

The digital signal DI after RLL correction is inputted to the Demodulator 120 for demodulation. The demodulation process is well known in the art and will not be explained in great detail herein. Errors may be found during to demodulation process and the demodulation detection signal S_dem is outputted from RLL protection circuit 114 may update the data stored in the CI table 142 to mark the position of the error data in a ECC block.

The demodulated signal is inputted to the ECC decoder 130 for ECC correction. In this embodiment, ECC decoder 130 performs RSPC (Reed-Solomon Product Code) decoding operation not only according to the number and the location of error and erasure but also the information stored in the CI table 142. In this embodiment, the ECC decoder 130 will consider not only the number of erasure but also the confidence index corresponds to this RS code to decide to perform RSPC decoding operation or not. The confidence index may be used to weight the erasure of this RS code. Taking Reed-Solomon code (N, K, d)=(182, 172, 11) as an example, if the number of erasure is larger than 11, the conventional ECC decoder will not perform ECC decoding on this RS code. However, if the number of erasure is larger than 11 but the confidence indexes correspond to those erasures represent that the performance of the data accessing operation is good, the ECC decoder may disregard the large number of erasures and still perform RSPC decoding operation on this RS code. If the number of erasure is far smaller than 11 (5, for example) and the confidence indexes correspond to those erasures represent that the performance of the data accessing operation is good, the ECC decoder may regard these erasures as errors and perform RSPC decoding operation on this RS code.

The method for operating the device 100 according to this embodiment is described as follows.

Step 10: Sample the DVD read signal DRB to generate a multi-level digital signal D1.

Step 20: Generate a plurality of confidence indexes corresponding to the quality of the read signal DRB.

Step 30: Store the confidence indexes in the CI table of the memory.

Step 40: Update the CI table with the result of RLL correction and demodulation. Step 50:Generate an erasure table and perform ECC correction according to the confidence indexes stored in the CI table.

Figure 5:
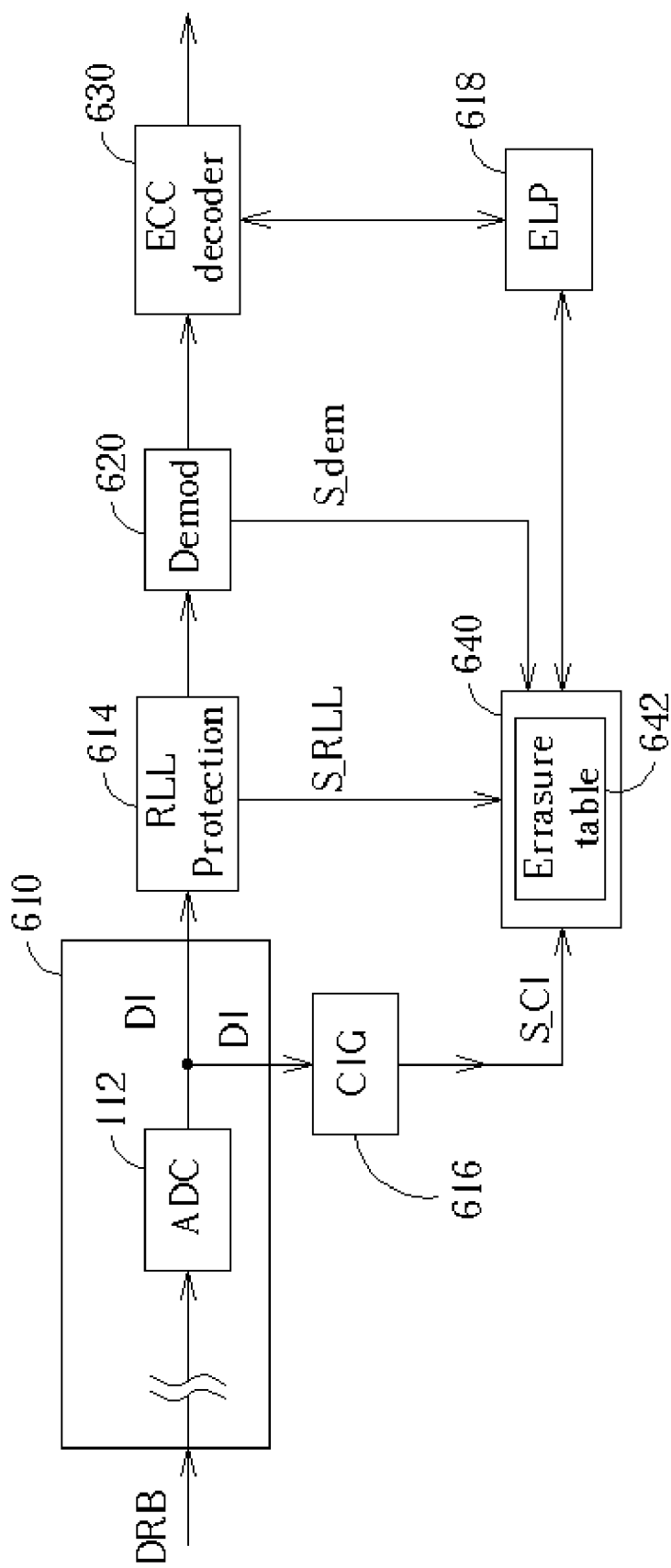
FIG. 5 is a block diagram of a device for decoding disc read signal according to another embodiment of the present invention.

FIG. 5 is a block diagram of a device for decoding disc read signal according to another embodiment of the present invention. In this embodiment, the erasure table 642 is set in the memory 640 and the CIG 616 is to generate the erasure and the confidence index of the digital signal DI to fill the erasure table 642. In this manner, the erasure table in this embodiment not only stores the erasure information of the ECC block but also the information indicating the performance of the data accessing operation when accessing corresponding data of this ECC block. In addition, the RLL protection circuit 614 and the demodulator 620 may update the erasure table according the result of RLL correction and demodulation. The data of the erasure table 642 may be inputted into erasure locator polynomial generating circuit (ELP) 618 to generate an erasure locator polynomial to ECC decoder 630. The ECC decoder 630 performs RSPC (Reed-Solomon Product Code) decoding operation according to the erasure locator polynomial. In this embodiment, the erasure locator polynomial is generated not only according to the number and the location of error and erasure but also the confidence indexes determined by CIG 616.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A device for decoding a disc read signal generated by accessing data stored in a disc storage medium, the device comprising:

a multi-level analog-to-digital converter (ADC) for digitizing the disc read signal to generate a digitized disc read signal;

a confidence index generating circuit for generating a plurality of confidence indexes according to the magnitude of the digitalized disc read signal;

a demodulator coupled to the multi-level ADC for demodulating the digitalized disc read signal to generate a demodulated disc read signal; and an Error Correction Code (ECC) decoder coupled to the demodulator for decoding the demodulated disc read signal according to the confidence indexes.

2. The device of claim 1, wherein the confidence indexes is generated according to the statistical distribution of a plurality of digitized disc read signal such that the confidence indexes is for indicating the reliability of the disc read signal.

3. The device of claim 2, wherein the confidence indexes is generated through comparing the number of the digitized disc read signal whose magnitude fall within a predetermined range with a predetermined threshold.

4. The device of claim 1, wherein the device further comprises a confidence index table for storing the confidence indexes.

5. The device of claim 1, wherein each of the confidence indexes is correspondent to a word, a row, or an ECC block.

6. The device of claim 1, wherein the demodulator is further for updating the confidence index table according to the demodulation result.

7. The device of claim 1, wherein the device further comprises a Run Length Limited (RLL) protection circuit for performing RLL correction on the digitized disc read signal.

8. The device of claim 7, wherein the Run Length Limited (RLL) protection circuit is further for updating the confidence index table according to the RLL correction result.

9. The device of claim 7, wherein the RLL protection circuit updates the confidence index table through outputting a RLL detection signal, wherein the magnitude of the RLL detection signal corresponds to the inverse proportion of the difference between the magnitude of an error bit of the digitalized disc read signal and a DC level of the digitalized disc read signal.

10. The device of claim 1, wherein the ECC decoder perform Reed-Solomon Product Code (RSPC) decoding operation to decode the demodulated disc read signal.

11. The device of claim 1, wherein the ECC decoder further comprises an erasure table for generating an erasure information according to the confidence indexes.

12. The device of claim 11, wherein the ECC decoder decodes the demodulated disc read signal according to the erasure information stored in the erasure table.

13. The device of claim 1, wherein the confidence index generating circuit is further for generating an erasure information according to the confidence indexes, wherein the erasure information at least indicate the location and the number of the erasure.

14. The device of claim 13, wherein the device further comprises an erasure table for storing the erasure information.

15. The device of claim 14, wherein the demodulator is further for updating the erasure table according to the demodulation result.

16. The device of claim 14, wherein the device further comprises a Run Length Limited (RLL) protection circuit for performing RLL correction on the digitized disc read signal and the Run Length Limited (RLL) protection circuit is further for updating the erasure table according to the RLL correction result.

17. The device of claim 16, wherein the RLL protection circuit updates the erasure table through outputting a RLL detection signal, wherein the magnitude of the RLL detection signal corresponds to the inverse proportion of the difference between the magnitude of an error bit of the digitalized disc read signal and a DC level of the digitalized disc read signal.

18. The device of claim 14, wherein the device further comprises an erasure locator polynomial generator for generating a erasure locator polynomial generator according to the erasure information.

19. The device of claim 18, wherein the ECC decoder decodes the demodulated disc read signal according to the erasure locator polynomial.

20. The device of claim 1, wherein the optical storage medium is a Digital Versatile Disc (DVD).

21. A method for decoding a disc read signal generated by accessing data stored in a disc storage medium, the method comprising:

digitizing the disc read signal to generate a multi-level digitized disc read signal;

generating a plurality of confidence indexes according to the magnitude of the digitalized disc read signal;

demodulating the digitalized disc read signal to generate a demodulated disc read signal; and decoding the demodulated disc read signal according to the confidence indexes.

22. The method of claim 21, wherein the confidence indexes is generated according to the statistical distribution of a plurality of digitized disc read signal such that the confidence indexes is for indicating the reliability of the disc read signal.

23. The method of claim 22, wherein the confidence indexes is generated through comparing the number of the digitized disc read signal whose magnitude fall within a predetermined range with a predetermined threshold.

24. The method of claim 21, wherein the method further comprises a step of storing the confidence indexes.

25. The method of claim 21, wherein each of the confidence indexes is correspondent to a word, a row, or an ECC block.

26. The method of claim 21, wherein the method further comprises a step of updating the confidence indexes according to the demodulation result.

27. The method of claim 21, wherein the method further comprises a step of performing RLL correction on the digitized disc read signal and updating the confidence indexes according to the RLL correction result.

28. The method of claim 21, wherein the step of decoding the demodulated disc read signal ECC decoder is executed through performing Reed-Solomon Product Code (RSPC) decoding operation.

29. The method of claim 21, wherein the method further comprises steps of generating an erasure information according to the confidence indexes and decoding the demodulated disc read signal according to the erasure information.

30. The method of claim 21, wherein the method further comprises a step of generating an erasure information according to the confidence indexes, wherein the erasure information at least indicate the location and the number of the erasure.

31. The method of claim 30, wherein the method further comprises a step of updating the erasure information according to the demodulation result.

32. The method of claim 30, wherein the method further comprises steps of performing RLL correction on the digitized disc read signal and updating the erasure information according to the RLL correction result.

33. The method of claim 30, wherein the method further comprises steps of generating a erasure locator polynomial generator according to the erasure information and decoding the demodulated disc read signal according to the erasure locator polynomial.

34. The method of claim 21, wherein the optical storage medium is a Digital Versatile Disc (DVD).

* * * * *